US007950351B2

(12) United States Patent
Mann

(10) Patent No.: US 7,950,351 B2
(45) Date of Patent: May 31, 2011

(54) COMBINED APPLICATOR AND FEEDER FOR LIVESTOCK

(76) Inventor: Fred W. Mann, Waterville, KS (US)

( * ) Notice: Subject to any disclaimer, the term of this patent is extended or adjusted under 35 U.S.C. 154(b) by 684 days.

(21) Appl. No.: 12/019,540

(22) Filed: Jan. 24, 2008

(65) Prior Publication Data

US 2008/0127903 A1 Jun. 5, 2008

Related U.S. Application Data

(63) Continuation-in-part of application No. 11/439,922, filed on May 24, 2006, now abandoned.

(60) Provisional application No. 60/683,941, filed on May 24, 2005.

(51) Int. Cl.
*A01K 29/00* (2006.01)

(52) U.S. Cl. ......................................... 119/660; 119/652

(58) Field of Classification Search .................. 119/660, 119/652, 656, 657, 650, 661; 43/124, 131; D30/121, 133
See application file for complete search history.

(56) References Cited

U.S. PATENT DOCUMENTS

| | | | | |
|---|---|---|---|---|
| 882,985 | A | * | 3/1908 | Wilson .......................... 119/660 |
| 1,095,471 | A | * | 5/1914 | Sheldon ........................ 119/652 |
| 1,396,235 | A | | 11/1921 | Renstrom |
| 2,273,616 | A | * | 2/1942 | Beatty .......................... 119/53.5 |
| 2,709,988 | A | | 6/1955 | Hatcher |
| 2,890,681 | A | | 6/1959 | Sack |
| 2,933,063 | A | | 4/1960 | Geerlings |
| 2,969,769 | A | | 1/1961 | Mann |
| D201,251 | S | | 6/1965 | Watlington |
| 3,187,722 | A | | 6/1965 | Gilmore et al. |
| 3,205,860 | A | | 9/1965 | Moore |
| 3,400,688 | A | | 9/1968 | Koinzan |
| 3,821,940 | A | | 7/1974 | Mann |
| 3,941,096 | A | | 3/1976 | Mann |
| 4,023,532 | A | | 5/1977 | Goodwin |
| 4,023,533 | A | | 5/1977 | Mann |
| 4,303,040 | A | | 12/1981 | Mann |
| D295,905 | S | | 5/1988 | Swartzendruber et al. |
| D326,743 | S | | 6/1992 | Haynes |
| 5,224,443 | A | | 7/1993 | Leslie |
| D347,303 | S | | 5/1994 | Mann |
| 5,630,375 | A | | 5/1997 | Mann |

OTHER PUBLICATIONS

"Brower-Tuff Features LMF10", Brower, Houghton Iowa, *LMF10 product literature*, (May 24, 2005).
Mann Enterprises, Inc., "Bull Master", *feeder product literature*, (Sep. 13, 2007).

* cited by examiner

*Primary Examiner* — T. Nguyen
(74) *Attorney, Agent, or Firm* — Law Office of Mark Brown, LLC; Mark E. Brown

(57) ABSTRACT

A combined applicator and feeder for livestock includes an applicator for livestock treatment compositions, such as insecticide, and a feeder assembly. An optional liquid applicator assembly includes a cover with a weather-impervious upper layer and a liquid-permeable, absorbent lower layer. An optional liquid reservoir communicates with the cover lower layer for saturating same with liquid, such as pesticide. The feeder assembly provides a support for the cover.

16 Claims, 15 Drawing Sheets

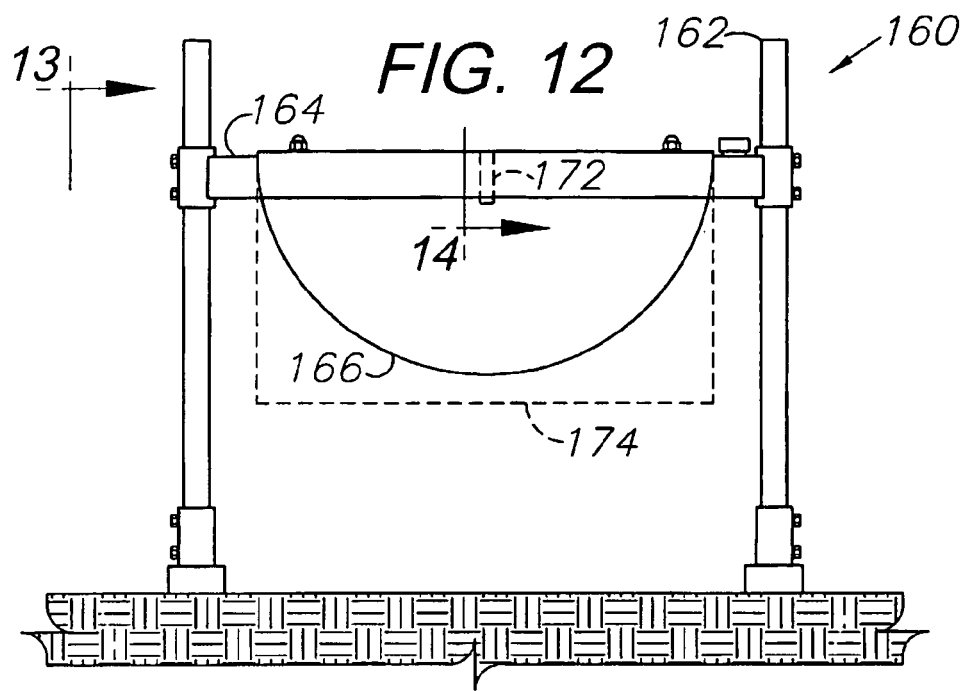
FIG. 12
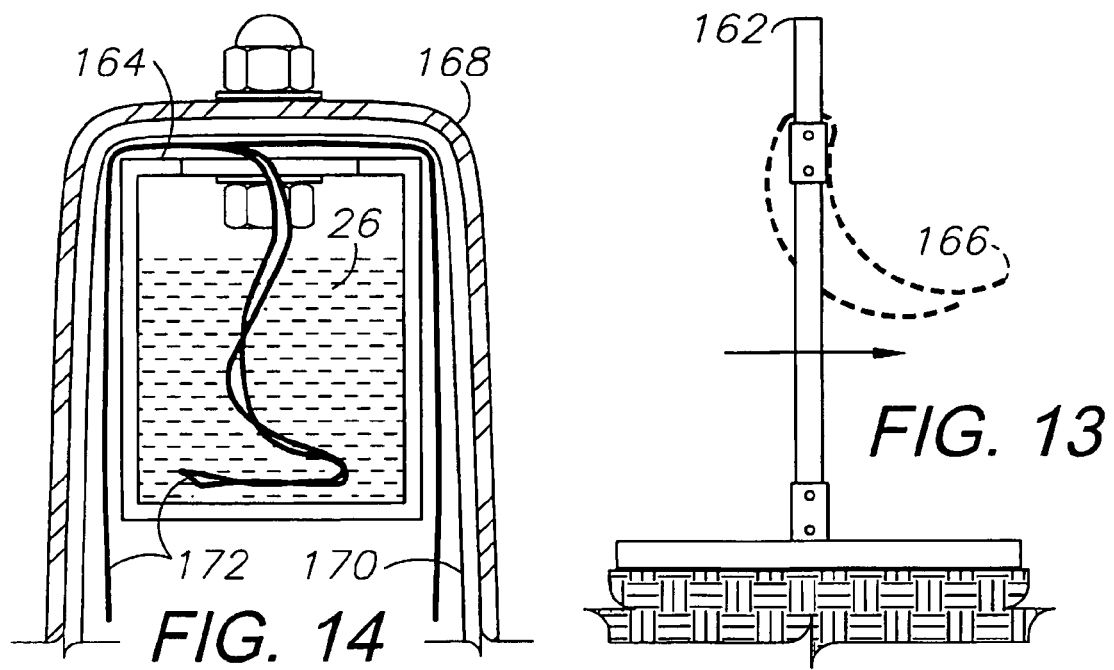
FIG. 14
FIG. 13

COMBINED APPLICATOR AND FEEDER FOR LIVESTOCK

CROSS-REFERENCE TO RELATED APPLICATIONS

This application is a continuation-in-part of Ser. No. 11/439,922 filed May 24, 2006, now abandoned, which claims priority in Ser. No. 60/683,941, filed May 24, 2005, which are incorporated herein by reference.

BACKGROUND OF THE INVENTION

1. Field of the Invention

The present invention relates generally to livestock treatment, and in particular to an apparatus for applying liquid, such as pesticides, to livestock.

2. Description of the Related Art

In the field of animal husbandry, livestock commonly require treatment for controlling various pests, insect larvae, infestations, infections and other potentially harmful and contagious conditions. Liquid bases are commonly used as the delivery carriers for medications and pesticides. Such medications are also available as powders, which can be applied with various dusting devices. For example, the Dusticator™ device is available from Mann Enterprises. Inc. of Waterville, Kans. and includes a livestock feeder combined with porous bags of powdered insecticide, which "dust" the livestock as they are feeding. See, for example. Mann U.S. Pat. No. 3,941,096 and No. 4,023,533.

The liquid compositions can be poured directly onto the livestock for topical applications. However, combining a medication or insecticide delivery system with a feeder or mineral dispenser has several advantages. Such equipment can operate automatically to treat entire herds of livestock without human intervention. Cattle and other animals requiring such treatments seek access to feed, water and minerals, such as salt blocks, on a regular and frequent basis. Preferably medications can be applied while the animals are in the process of consuming feed, minerals, water, etc. In this manner the livestock are essentially voluntarily medicating themselves without any need for individual treatment or attention from the ranch operators.

It would also be preferable for such liquid applicators to be adaptable to various configurations of feeders, waterers and mineral dispensers. Another preferred feature provides for storing a supply of medication whereby multiple applications can be made between replenishments. Such applicators should also be sufficiently rugged to withstand abuse by livestock, exposure to the elements and extremes of temperature associated with permanent field placement.

Heretofore there has not been available an applicator for applying insecticide and medications to multiple head of livestock with the advantages and features of the present invention.

SUMMARY OF THE INVENTION

In the practice of an aspect of the present invention, a combined applicator and feeder is provided for topically and automatically applying insecticide and other compositions to livestock. The application can be in conjunction with, for example, consuming feed, water and minerals. A receptacle assembly is provided and includes a flexible cover, with an upper layer impervious to the weather and an optional lower, highly absorbent layer adapted for direct contact with the heads of the livestock as they are eating from the feeder. A liquid reservoir can optionally be provided for automatically and continuously replenishing the liquid saturating the lower layer of the cover.

BRIEF DESCRIPTION OF THE DRAWINGS

FIG. 12 is a front elevational view of another modified aspect of the invention.

FIG. 13 is a side elevational view thereof.

FIG. 14 is an enlarged, fragmentary, cross-sectional view thereof, taken generally along line 14 in FIG. 12.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively the geometric center of the embodiment being described and designated parts thereof. Said terminology will include the words specifically mentioned, derivatives thereof and words of similar meaning. The invention can be fabricated in various sizes and configurations from a wide variety of suitable materials, which are chosen for their characteristics according to the intended use and the operation of the invention.

II. Liquid Applicator for Livestock

Figure 1:
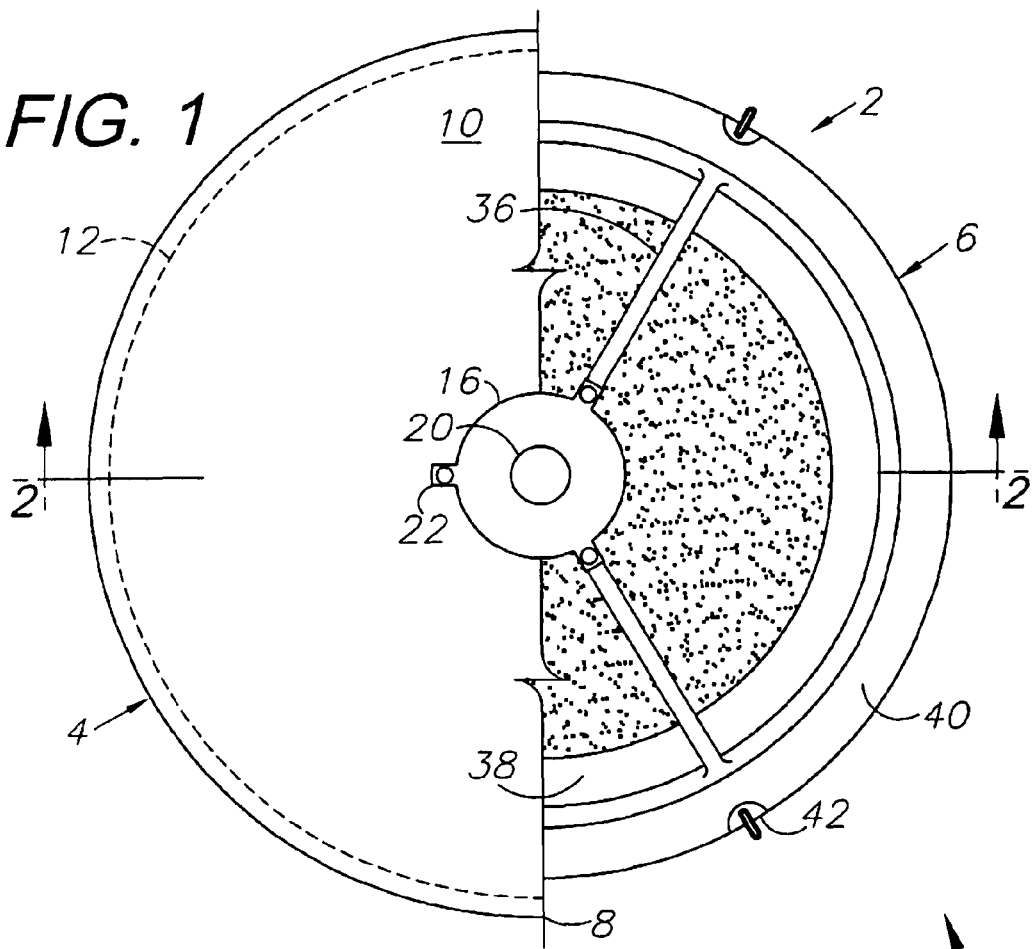
FIG. 1 is a top plan view of a combined applicator and fear comprising an aspect of the present invention, shown as a cover assembly for a mineral dispenser.
Figure 2:
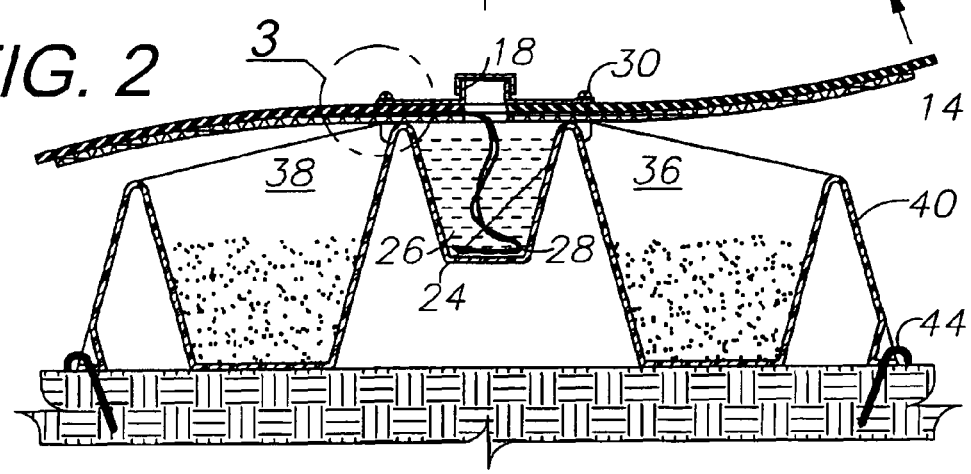
FIG. 2 is a cross-sectional view thereof, taken generally along line 2-2 in FIG. 1.
Figure 3:
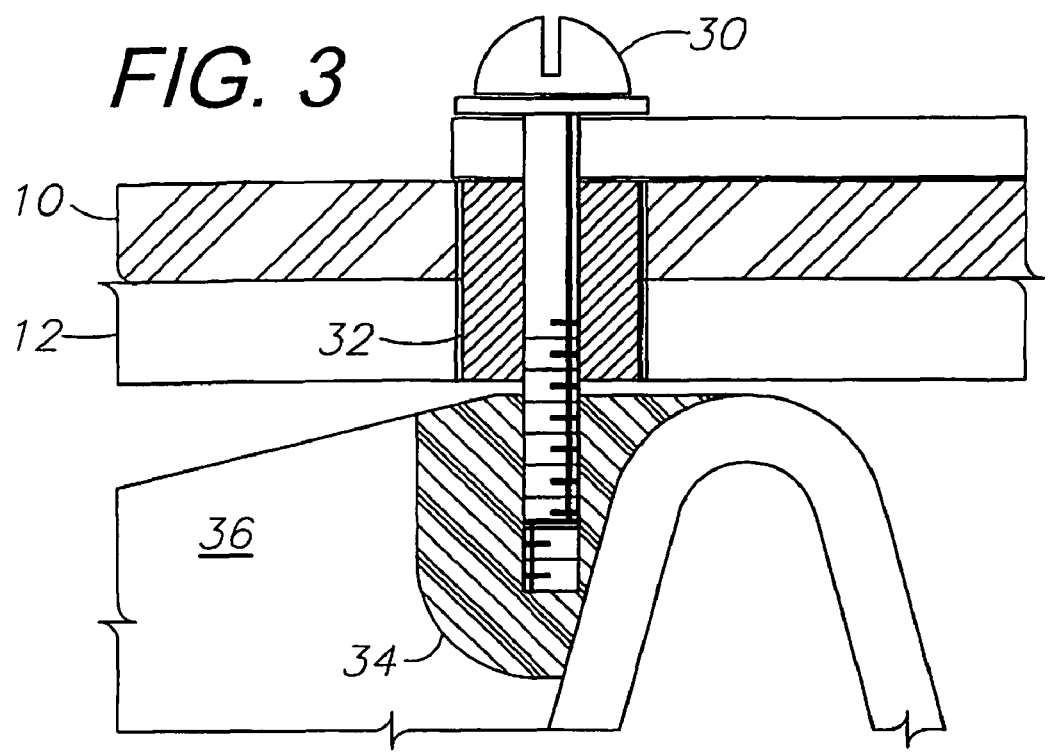
FIG. 3 is an enlarged, fragmentary, cross-sectional view thereof taken generally within circle 3 in FIG. 2.

Referring to the drawings in more detail, the reference numeral 2 generally designates a combination liquid applicator assembly 4 and mineral feeder assembly 6 embodying an aspect of the present invention, as shown in FIGS. 1-3. The applicator assembly 4 includes a flexible cover 8 with an upper, weather-impervious layer 10 (e.g., masticated rubber, 2-polymer cast urethane or some other suitable material) and a lower, liquid-permeable layer 12 comprising, e.g. polypropylene felt or some other suitable material. The upper layer 10 is slightly larger than the lower layer 12, providing a slight perimeter overhang 14. A top plate 16 includes a center filler hole 18 closed by a filler cap 20 and multiple (e.g. three are shown) radially-extending mounting tabs 22. Alternatively, the lower layer 12 can be eliminated by mixing insecticide (e.g. powdered cumophos or various other insecticides and other material compositions for application to livestock) with the 2-polymer urethane which is then poured into a suitable mold for forming the cover 8. Still further, the lower layer 12 can be saturated with powdered insecticide or other compositions for brushing livestock as they contact and rub against the lower layer 12.

An optional center reservoir 24 is formed integrally with the feeder assembly 6 and receives liquid 26 through the center filler hole 18. The feeder assembly 6 can be similar to the feeder assemblies shown in Mann U.S. Pat. No. Des.347,303, which is incorporated herein by reference, with the addition of the center reservoir 24. A sidewall 40 of the combination liquid applicator and feeder 2 extends further out (i.e. to the edge of the base rim) than the construction shown in the design patent for greater mineral and feed capacity. A wick 28 comprising an absorbent, wicking material extends into the reservoir 24 and engages the absorbent lower layer 12 of the cover 8 for maintaining a saturating flow of liquid 26 at a controlled rate. The cover 8 is mounted on the feeder assembly 6 by multiple fasteners 30, e.g., screws, threadably extending through internally-threaded, cylindrical spacers 32 and into internally-threaded bosses 34 (FIG. 3), which are molded into radial, vertical dividers 36 of the feeder assembly 6, forming mineral feeder compartments 38 adapted for receiving various materials comprising livestock feed and/or minerals. The outer sidewall 40 terminates at a base 42 adapted for ground attachment with stakes 44. In operation, the liquid distribution rate can be controlled by the height of the spacers 32. Shorter spacers 32 allow greater compression of the cover 8, thus restricting liquid flow. Conversely, taller spacers 32 facilitate greater fluid flow rates. Loosening the screws 30 can likewise have the effect of increasing liquid flow.

Figure 4:
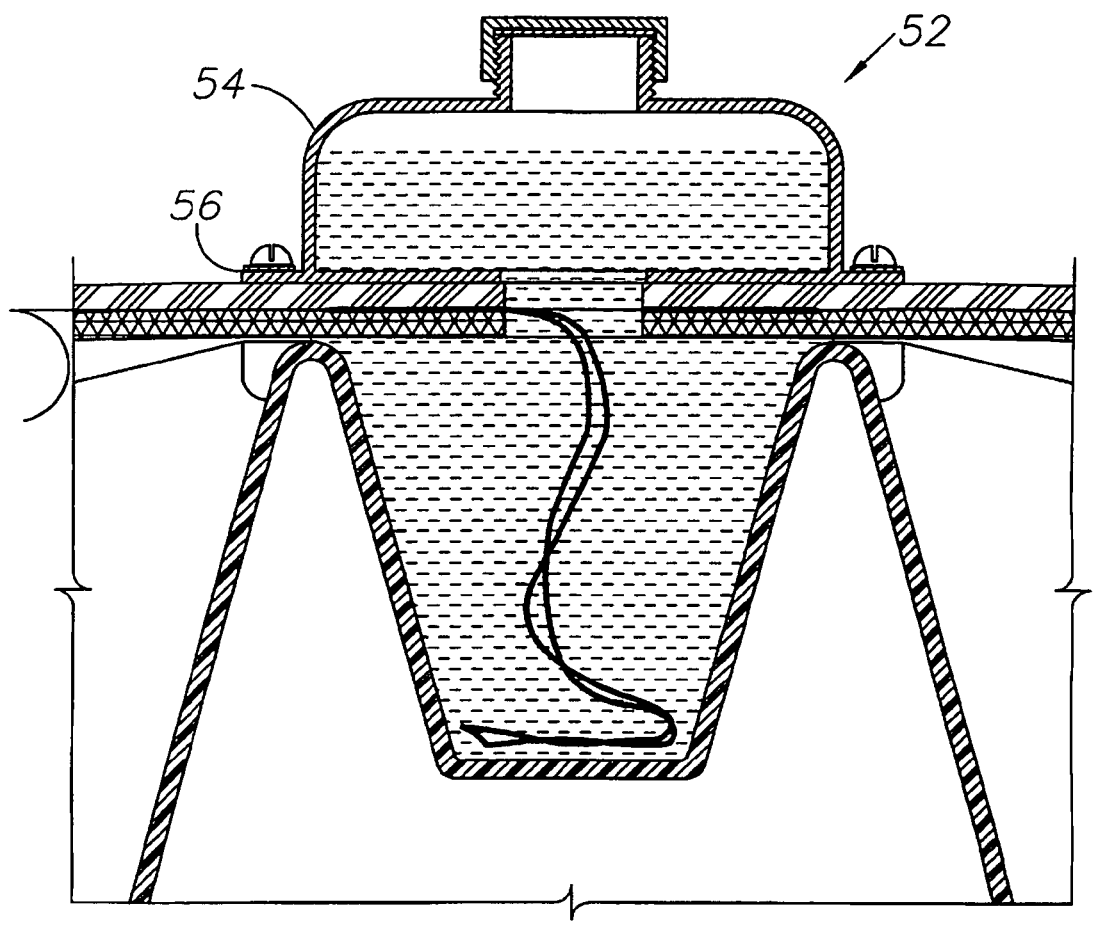
FIG. 4 shows a modified aspect thereof with an extended reservoir.
Figure 5:
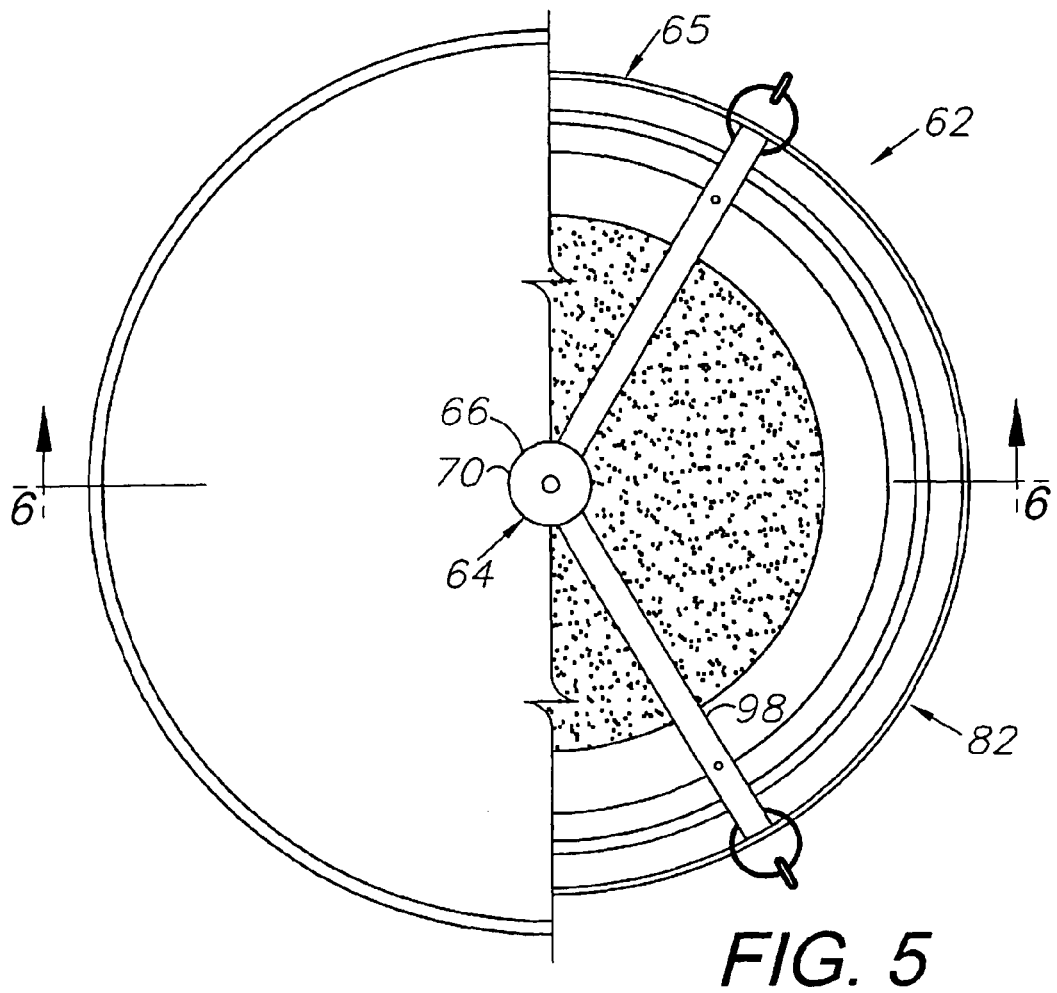
FIG. 5 shows another modified aspect thereof mounted on a different mineral or feed receptacle.
Figure 6:
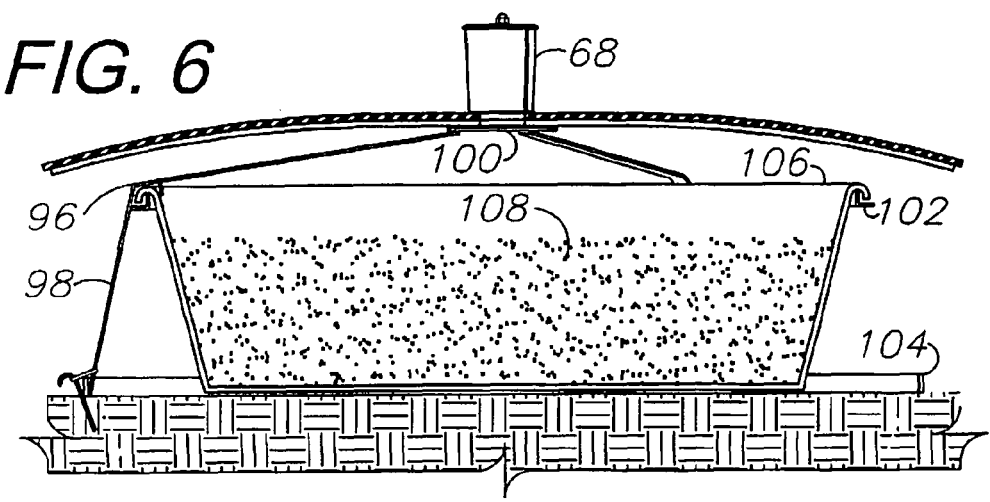
FIG. 6 is a cross-sectional view thereof, taken generally along line 6-6 in FIG. 5.
Figure 8:
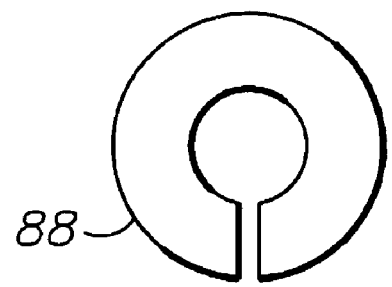
FIG. 8 is an enlarged plan view of a split washer thereof, taken generally along line 8 in FIG. 7.
Figure 7:
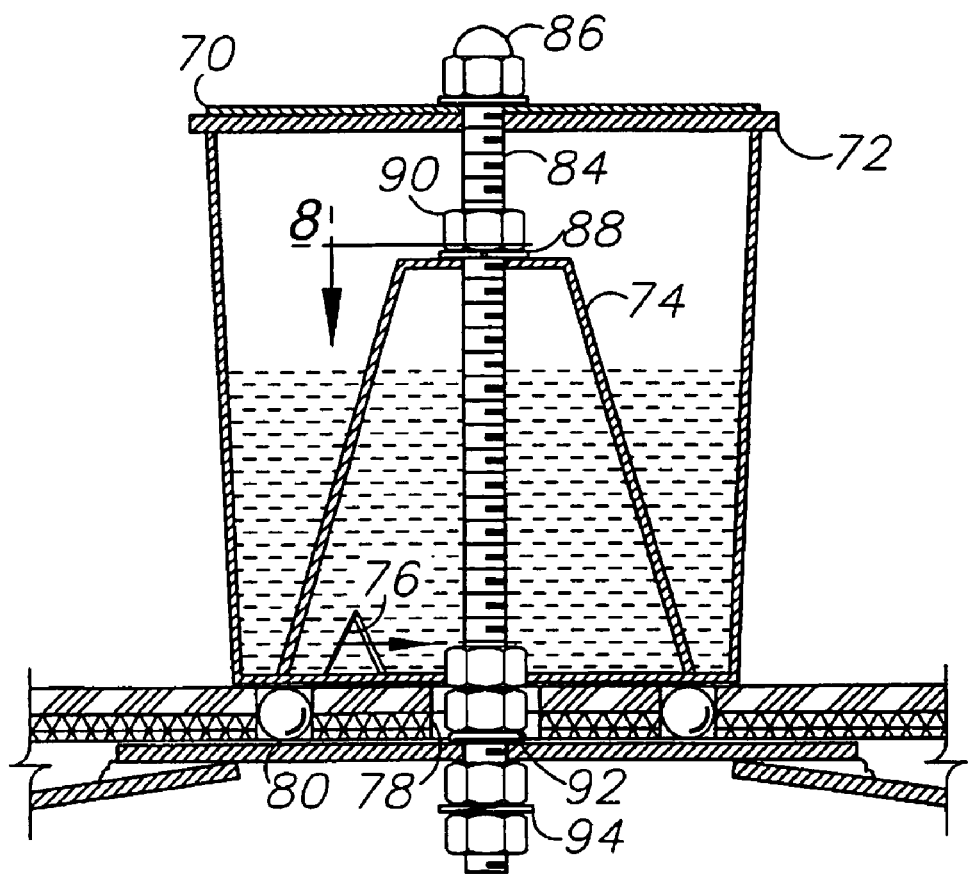
FIG. 7 is an enlarged, cross-sectional view thereof, particularly showing a liquid reservoir.

FIG. 4 shows a combination liquid applicator and feeder 52 comprising a modified aspect of the invention and including a reservoir extension 54 mounted on and extending upwardly from a top plate 56.

FIGS. 5-8 show a combination liquid applicator and mineral feeder 62 comprising another modified aspect of the invention and including a liquid applicator assembly 64 and a feeder assembly 65. The liquid applicator assembly 64 includes a reservoir 66 (FIG. 7) with a canister 68 enclosed by a lid 70 with a lid gasket 72. A pressure cone 74 is mounted in the canister 68 and includes a lower passage 76 through which the liquid 26 passes for exiting an outlet port 78 in the bottom of the canister 68 for absorption and distribution by the absorbent, lower layer 12 of the cover 8. The pressure cone 74 tends to equalize the liquid pressure at the outlet port 78 for even distribution with different levels of liquid 26 in the canister 68. Spacers 80 mounted in the cover 8 below the reservoir 66 can comprise steel balls or other suitable shapes, such as the cylindrical spacers 32. Steel balls are available in multiple diameters with small incremental differences, whereby considerable control of the liquid flow rate can be accomplished by varying the diameters of the steel balls 80.

The reservoir 66 and the cover 8 can be mounted on a mineral feeder assembly 82 by a continuously-threaded rod 84, which secures the lid 70 by an acorn nut 86 and the pressure cone 74 by a nut 90 and a slotted washer 88 (FIG. 8) adapted for ventilating the pressure cone 74. A pair of nuts 90 is provided over a sealing O-ring 92 in the outlet port 78. Another pair of nuts 90 and a lock washer 94 between the nuts 90 are mounted on the threaded rod 84 in proximity to its lower end below the cover 8 whereby the liquid applicator assembly 64 is mounted on the feeder assembly 65.

The feeder assembly 65 can be similar to the livestock feeder shown in Mann U.S. Pat. No. 5,630,375, which is incorporated herein by reference. A frame subassembly 96 includes multiple (e.g., three are shown) legs 98 radiating outwardly from a frame center plate 100 to a tub support ring 102 and downwardly to a base ring 104. The pairs of nuts 90 are adapted for securely attaching the threaded rod 84 to the frame center plate 100, with the O-ring 92 providing a liquid seal whereby the liquid 26 is diverted outwardly to the cover absorbent layer 12. A tub 106 is mounted on the frame subassembly 96 and can receive minerals 108, such as a salt block, feed or both.

Figure 9:
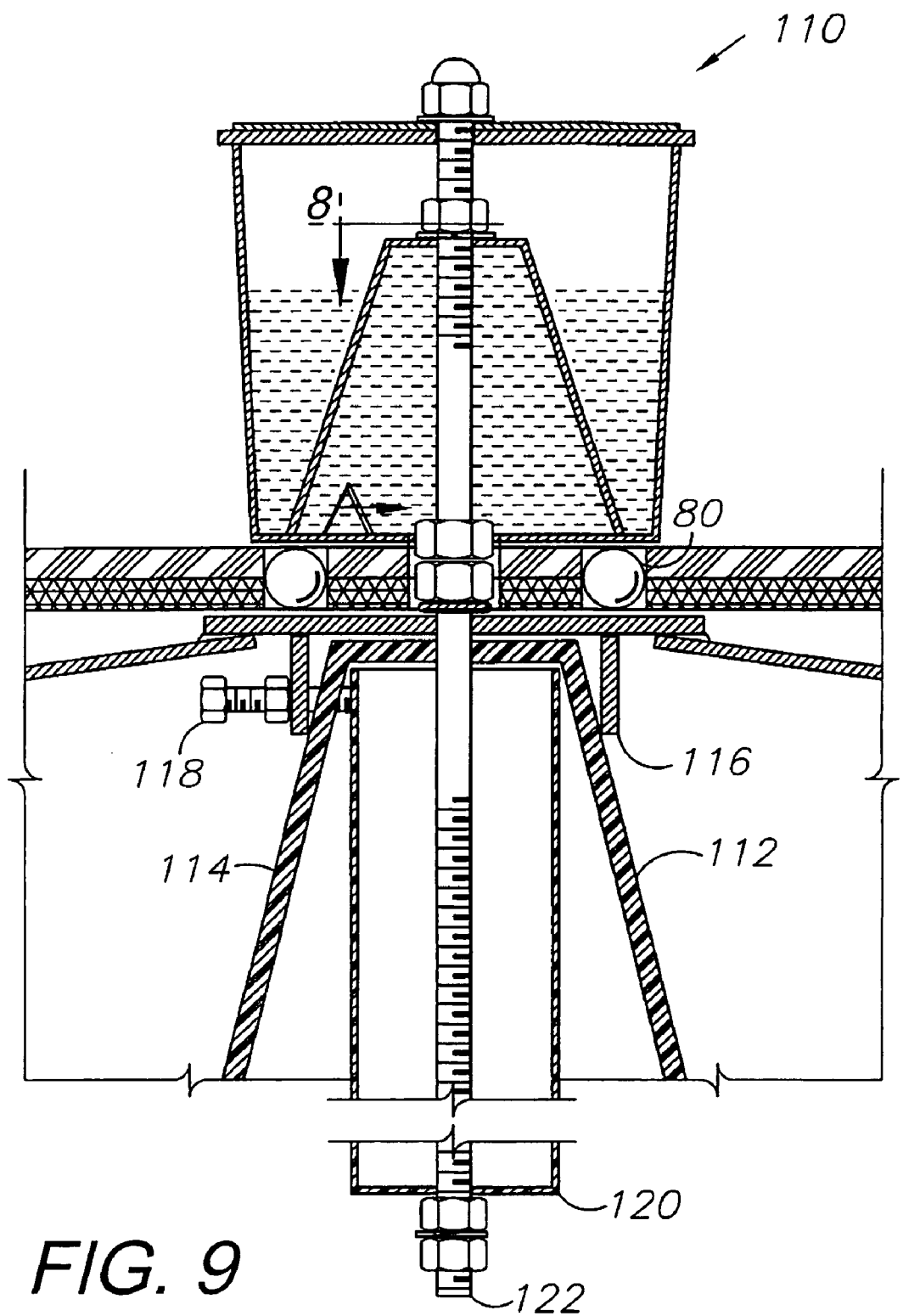
FIG. 9 is a cross-sectional view of a modified aspect thereof, adapted for mounting on a livestock mineral feeder manufactured by Bower Equipment of Houghton, Iowa.

FIG. 9 shows another aspect of the invention with a modified applicator assembly 110 adapted for mounting on a mineral feeder 112 available from Brower Equipment of Houghton, Iowa and including a central cone 114. The applicator assembly 110 includes an annular mounting ring 116 with a set screw 118 adapted for penetrating the upper end of the Brower mineral feeder cone 114 and engaging a tubular extension 120, which projects downwardly within the cone 114 to provide access to a lower pair of nuts 90 which are received on a threaded rod 122. Similar feeders are shown in Mann U.S. Pat. No. Des. 347,303, and could be fitted with a liquid applicator assembly similar to the applicator assembly 110.

Figure 10A:
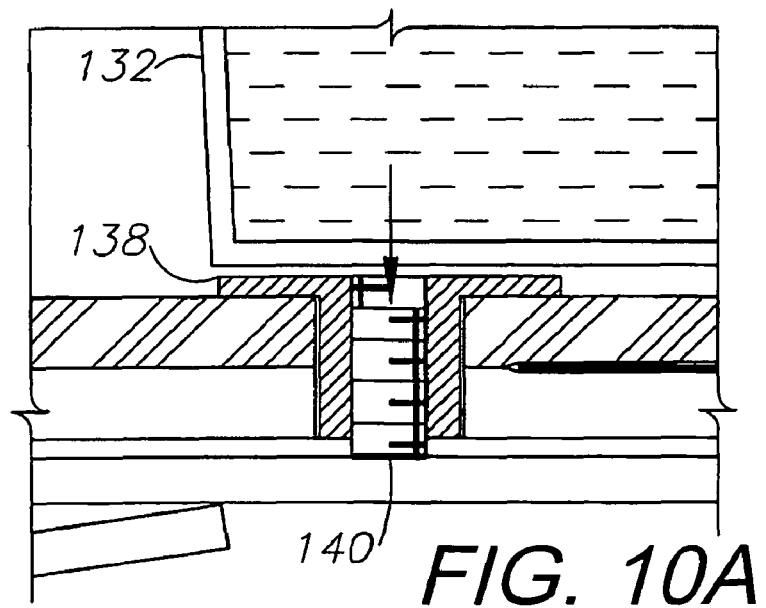
FIG. 10A shows another aspect of the invention with a reservoir mounted on the cover.
Figure 10:
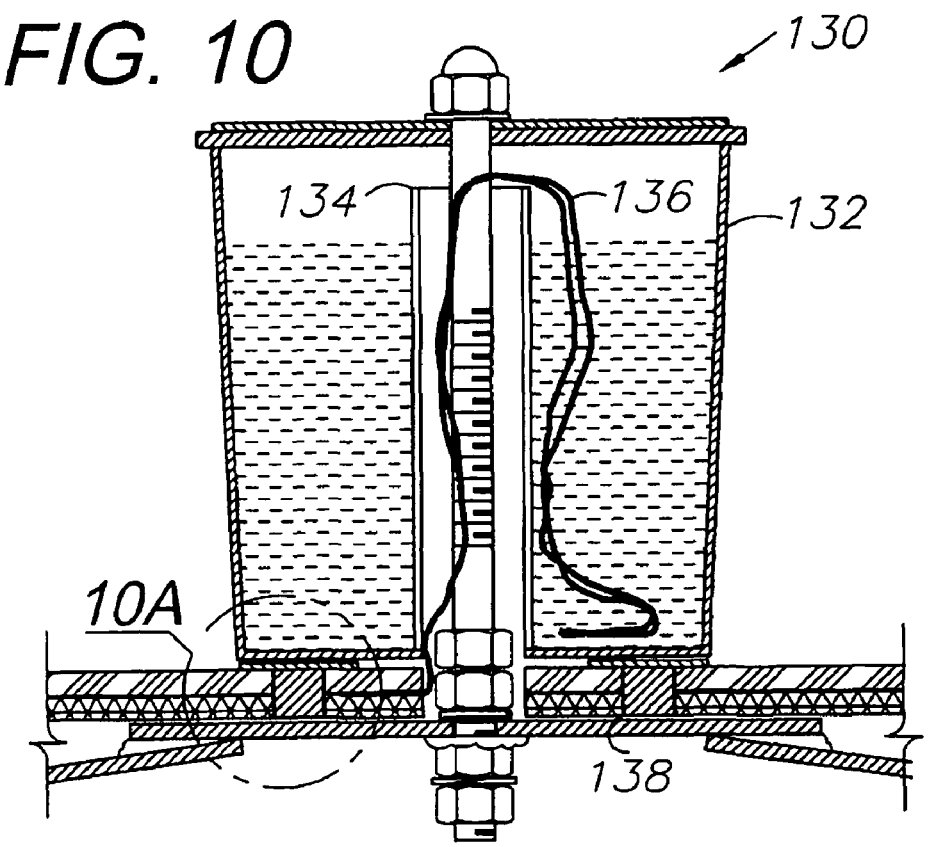
FIGS. 10 and 11 are cross-sectional views of other modified aspects of the invention.

FIGS. 10 and 10A show a liquid applicator 130 comprising another aspect of the invention with a reservoir 132 mounted on the cover 8, which in turn is mounted on the frame center plate 100 of the frame assembly 96, as described above and as shown in Mann U.S. Pat. No. 5,630,375. The reservoir 132 includes an overflow tube 134, which receives a wick 136 located within the reservoir 132 for immersion in the liquid 26, which is transferred by a wicking action to the absorbent lower layer 12. FIG. 10A shows a spacer 138 comprising a weld nut and extending through the cover 8 between the reservoir 132 and the frame center plate 100 for controlling the flow rate by means of an adjustable set screw 140, shown extending slightly downwardly from the spacer 138. Extending the set screw 140 tends to increase the liquid flow rate and vice versa.

Figure 11:
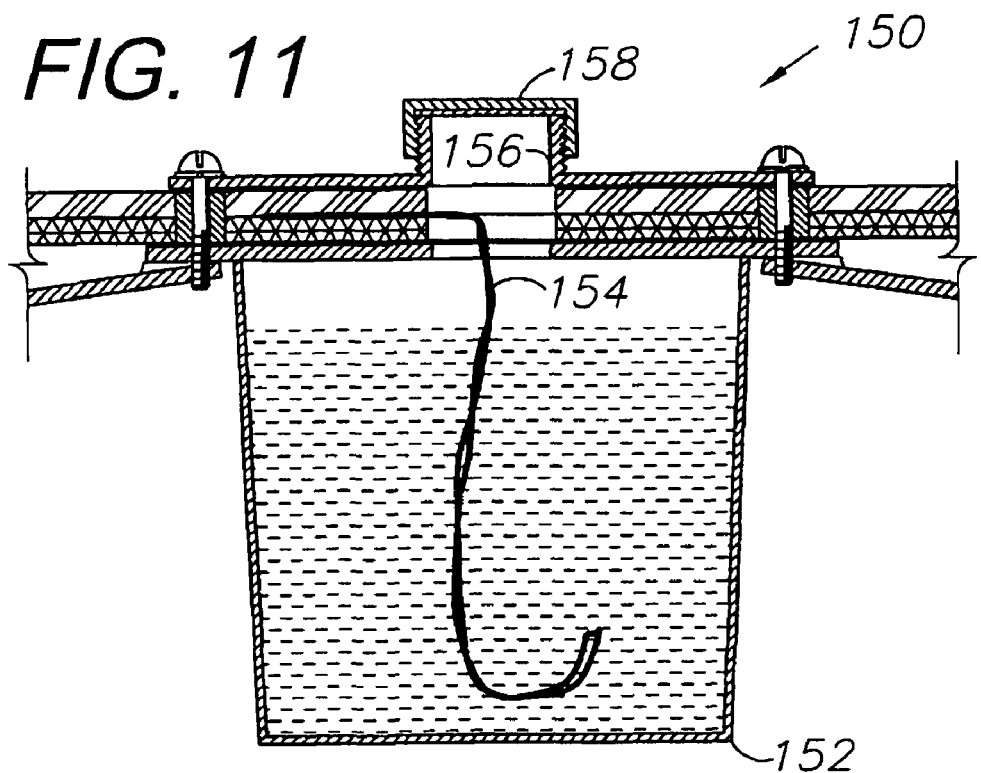

FIG. 11 shows a liquid applicator 150 comprising another aspect of the invention and including a reservoir 150 mounted on the underside of the frame center plate 100 and receiving a wick 154. A filler hole 156 is provided in the center plate 100 and is selectively closed by a filler cap 158.

FIGS. 12-14 shown a liquid applicator 160 comprising an H-frame assembly 162 with a hollow, tubular crosspiece comprising a reservoir 164. A cover 166 including an upper, weather-impervious layer 168 and a lower, liquid-permeable, absorbent layer 170 is draped over the crosspiece reservoir 164 and receives the liquid 26 therefrom through wicks 172. In addition to a circular cover 166 as shown in FIG. 12, a cover 174 with a rectangular configuration could be provided, as shown by the broken lines in FIG. 12. The liquid applicator 160 can be used as a barrier through which livestock must pass for access to, for example, feed and/or minerals. Multiple applicators 160 can be grouped in various combinations to guide livestock, which can pass through them or pass alongside them for application of the liquid 26 through contact. For example, a chute call be formed with sidewalls comprising multiple applicators 160 and livestock can be guided therethrough for liquid application to their sides through direct contact with the cover lower layers 170. Multiple applicators 160 can also be arranged in a circle or other enclosing configuration around a feeder or other device, whereby livestock must pass through the applicators 160 for access to the feed or minerals contained in the feeder positioned in the center of the enclosure. As an alternative or in addition to the cover 166, multiple wick material strips 172 can be suspended from the crosspiece reservoir 164 in communication with the liquid 26 therein for engagement by livestock passing alongside or through the applicators 160.

It is to be understood that the invention can be embodied in various forms, and is not to be limited to the examples discussed above. Other components and configurations can be utilized in the practice of the present invention. For example, the liquid reservoir can be omitted and the liquid 26 can be manually poured onto the cover lower layer 12 as required. The feeder assemblies can be molded with tapered configurations adapted for nesting in order to conserve for shipping and storage purposes. Moreover, rotational molding techniques can be utilized for molding two feeder assemblies joined at their bases in one mold, for separation after completion of the molding process. Other manufacturing and fabrication techniques can likewise be used to advantage.

Figure 15:
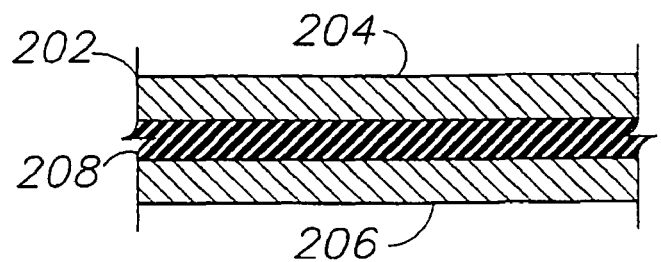
FIGS. 15-19 show alternative embodiment covers for applying liquids and other substances to livestock coming into contact therewith.
Figure 16:
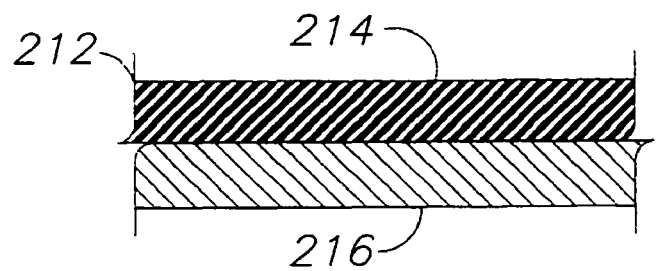
Figure 17:
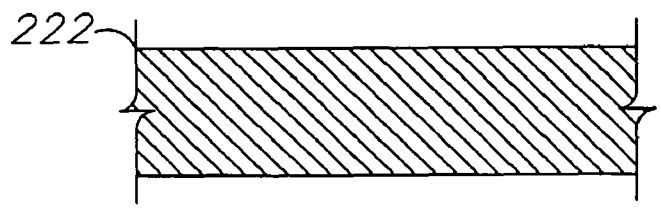
Figure 18:
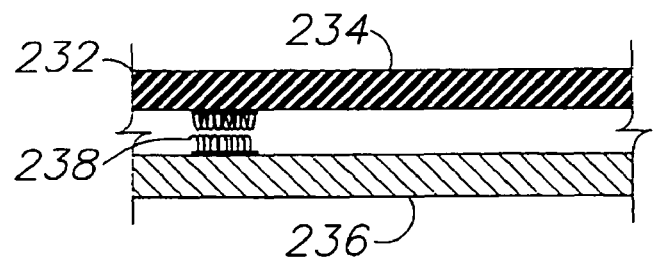
Figure 19:
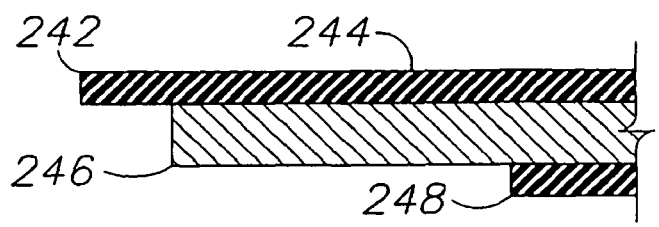
Figure 20:
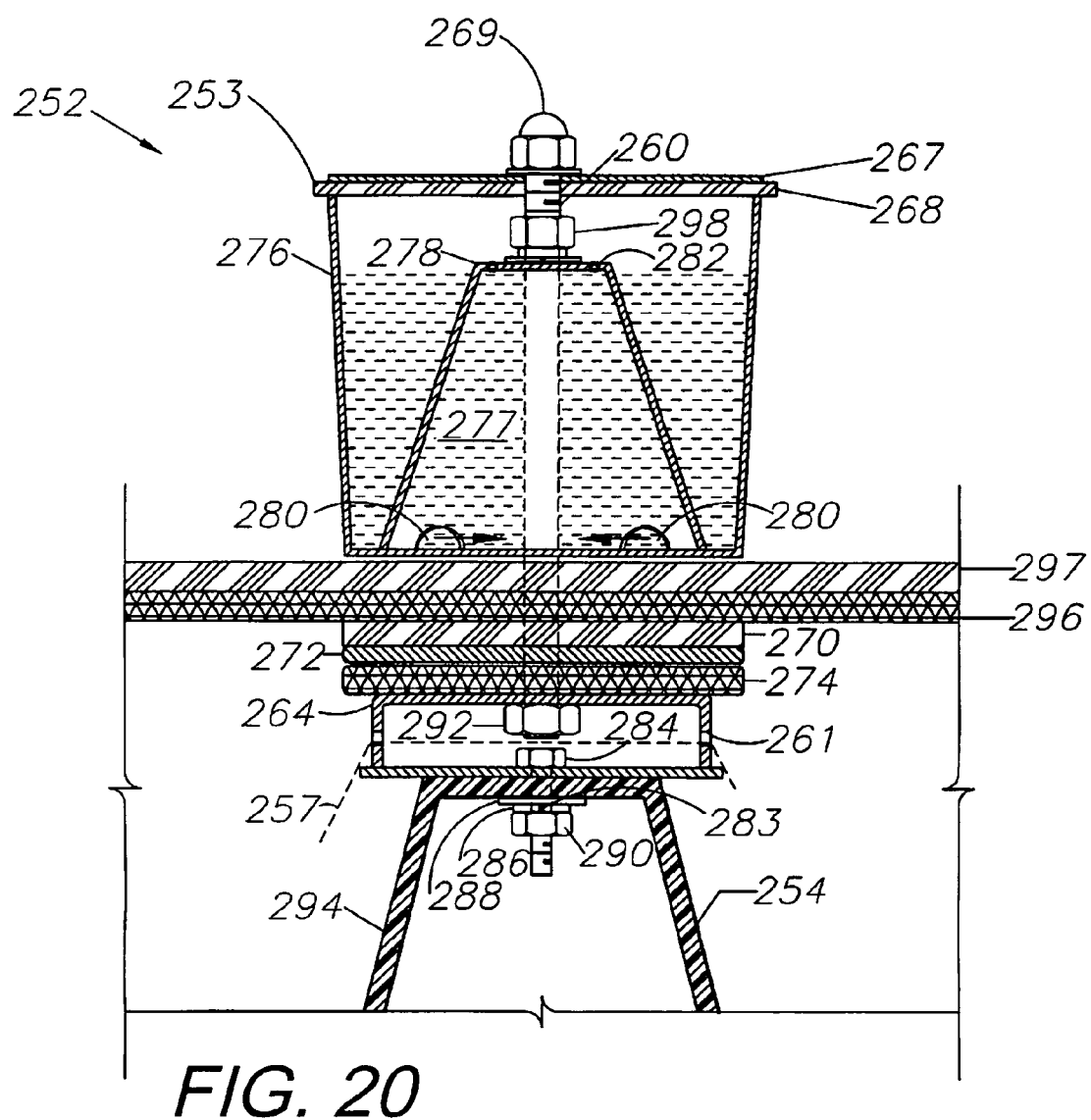
FIG. 20 is a cross-sectional view of a combination insecticide applicator and feeder for livestock, which comprises another modified aspect of the present invention.

An alternative embodiment cover 202 is shown in FIG. 15 and includes upper and lower felt layers 204, 206. A layer of urethane 208 is sprayed, brushed or otherwise applied to respective opposed surfaces of the felt layers 204, 206, which are then sandwiched together. The urethane 208 cures between the felt layers 204, 206. Livestock can contact either of the felt layers 204, 206 for application of liquid therefrom. Another alternative embodiment cover 212 is shown in FIG. 16 and includes an upper, urethane layer 214, which is sprayed, brushed or otherwise applied to a felt layer 216. Yet another alternative embodiment cover 222 is shown in FIG. 17 and comprises a single, monolithic material, such as felt, urethane, leather, etc. Such material can be saturated with insecticides, pharmaceuticals or other substances for application to and treatment of livestock. Another alternative embodiment cover 232 is shown in FIG. 18 and includes an upper, rubber layer 234 and a lower, felt layer 236, which can be secured together by suitable hook-and-loop fasteners 238, which can be sewn to the layers 234, 236. Still another alternative embodiment cover 242 is shown in FIG. 19 and includes an upper rubberized layer 244, which overhangs an intermediate, felt layer 246, which overhangs a lower rubberized layer 248 whereby respective wiping areas are defined by the overhangs. The covers can be freely rotatable with respect to the feeders and other support structures in order to enhance liquid application to livestock and to minimize cover damage. Moreover, various spoke and spider shaped structures can be installed under the covers for supporting same.

A combination applicator and feeder for livestock comprising another alternative aspect of the present invention is shown in FIGS. 20-23 and is designated by the reference 252. It generally comprises applicator assembly 253 and a feeder assembly 254 which are connected by a spacer assembly 264. The construction allows the applicator assembly 253 to freely rotate about a threaded rod 260 which secures the spacer assembly 264 to the feeder assembly 254. The threaded rod 260 terminates at a lock nut 292 inside the spacer assembly 264, which is attached to a feeder cone 294 by an anchor assembly 283.

Figure 21:
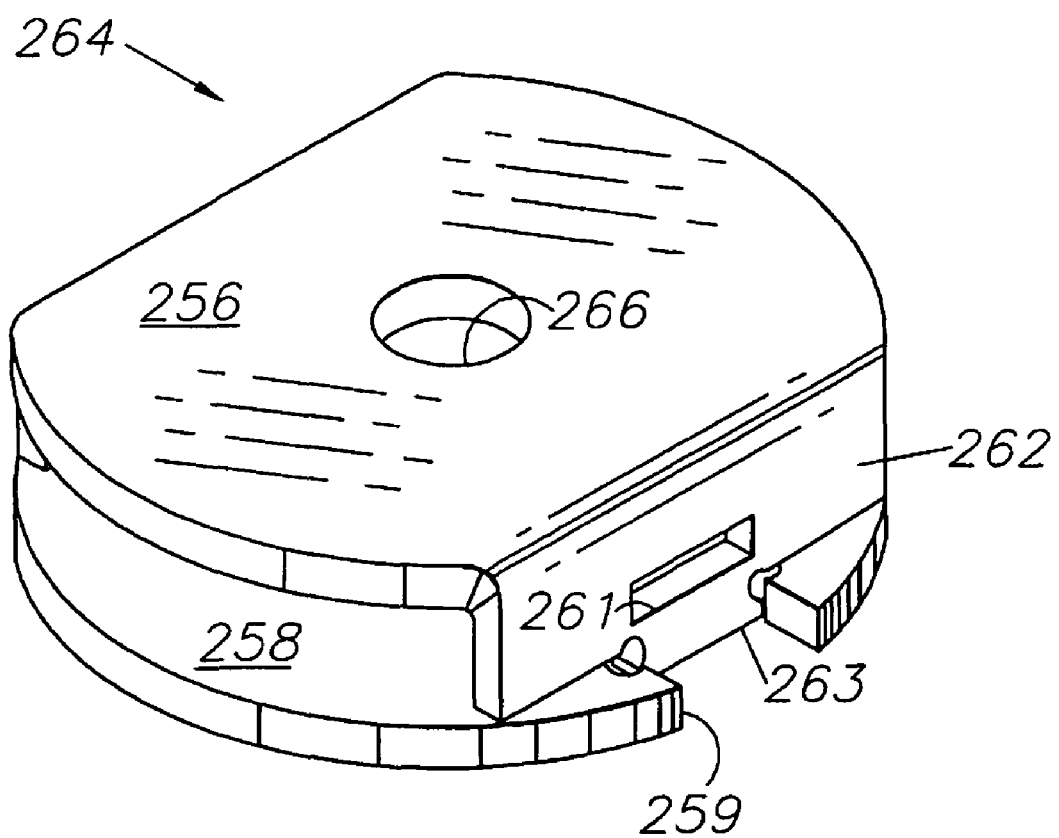
FIG. 21 is a perspective view of a spacer assembly thereof.
Figure 22:
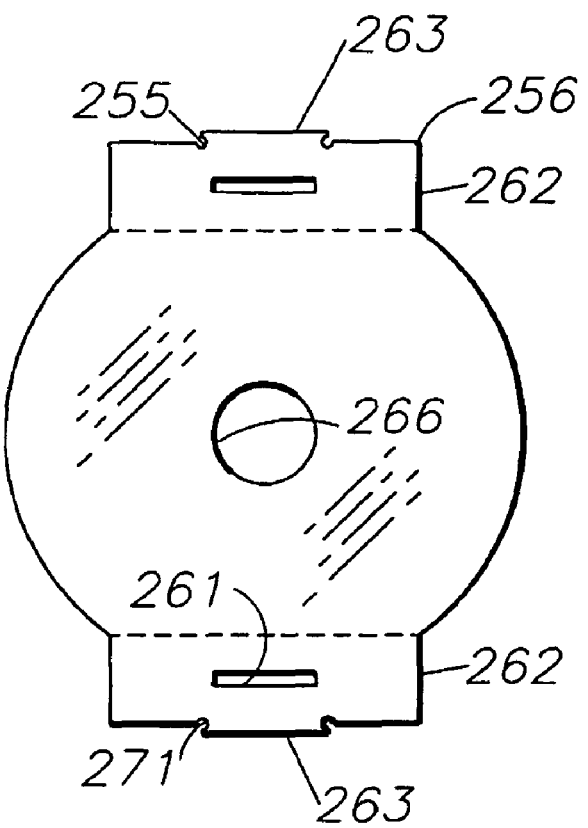
FIG. 22 is a top plan view of a top plate of the spacer assembly, shown in a prebend configuration.
Figure 23:
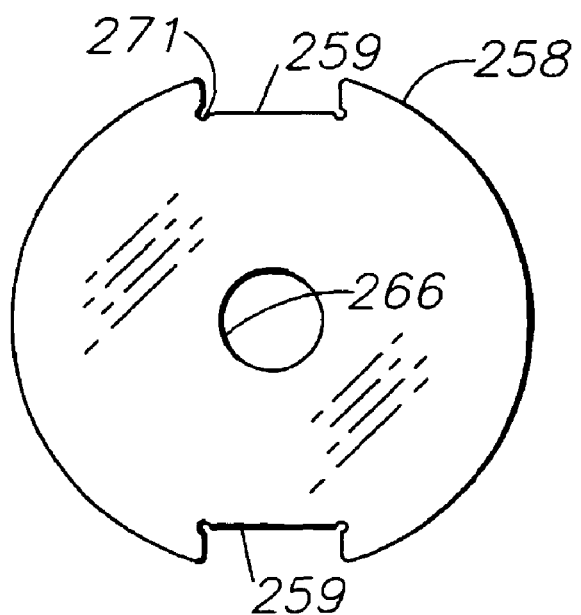
FIG. 23 is a top plan view of a bottom plate of the spacer assembly.

As shown in FIGS. 21-23, the spacer assembly 264 includes a top plate 256 including panels 262 with slots 262 and tabs 263, which extend from the panels 262. The slots 262 are adapted to receive tie-down straps 257 for securing the feeder assemblies together in nested configurations for shipping and storage. The spacer assembly 264 also includes a bottom plate 258 with notches 259, which receive the top plate tabs 263 with the spacer assembly 264 assembled. The plates 256, 258 include radiused corners 271, which facilitate forming the plates and resist stress fracturing. For fabricating the spacer assembly 264, the top plate panels 262 are bent approximately 90° from a top surface of the top plate 256. The tabs 263 are inserted into the bottom plate notches 259 and the plates 256, 258 are secured together, e.g., by welding. The entire spacer assembly 264 is then placed onto the threaded rod 260 via a bolt hole 266 in each plate, and is then secured with the locking nut 292 at the base of the rod 260.

The applicator assembly 253 is separated from the spacer assembly 264 by three layers, 270, 272, 274, as well as a felt layer 296 and a rubber layer 297 making up the cover. The rubber cushion 270 protects the felt layer 296 of the cover from grinding against the welded washer 272 when pressure is increased by a compression nut 298. The felt slip disk 274 protects the spacer assembly 264 from grinding against the welded washer 272, while also facilitating the free rotation of the applicator assembly 253.

The anchor assembly 283 is comprised of an anchor bolt 284, an anchor locking washer 286, an anchor washer 288 and an anchor nut 290. The anchor bolt 284 is threaded through the bottom plate 258 via the bolt hole 266 and through a similar hole in the top of the feeder cone 294. The anchor lock washer 286 and anchor washer 288 are then placed on the anchor bolt 284 and the entire assembly is held in place with the anchor nut 290. This assembly secures the spacer assembly 264 to the feeder assembly 254 while allowing the upper portion of the entire assembly to rotate freely.

The liquid applicator assembly 276 is fitted with a pressure cone 278 to provide greater stability and a more even application of the pesticide or medication onto the cover 296. Liquid pesticide or medication can be placed into the applicator assembly 276 by lifting a lid 267 which is held in place by an acorn nut 269. Once the pesticide or medication is placed inside the liquid applicator assembly 276 and fills a center reservoir 277, the lid 267 can be closed and the acorn nut 269 tightened. A rubber pad 268 between the lid 267 and the rest of the liquid applicator assembly 276 ensures a seal to prevent liquid from escaping the reservoir 277 if the combination applicator and feeder 252 is tipped over. The pesticide or medication enters the pressure cone 278 from the liquid applicator assembly 276 via the cone drain holes 280 and this fills tie center reservoir 277. Because of tie cone's wide displacement, pressure is diverted away from the center of the cover and is more evenly displaced, and the pesticide or medication likewise is more easily distributed. Vent holes 282 at the top of the pressure cone 278 prevent the cone from being overfilled and placing additional pressure on the cover 296, while ensuring that air is not trapped within the pressure cone 278 when the medication or pesticide enters through the drain holes 280.

The general purpose of the spacer assembly 264 is to allow rotation of the cover 296 is to ensure that the liquid inside of the center reservoir 277 can evenly wick to all areas of the felt layer 296 of the cover. As livestock rotates the applicator assembly 253 the felt layer of the cover 296 will dip in different places and continually change the wicking path, causing the pesticide or medication being delivered by the applicator assembly 253 to evenly distribute by gravity throughout the felt layer 296 and thus be evenly spread over the cattle using the applicator and feeder device 252.

Figure 24:
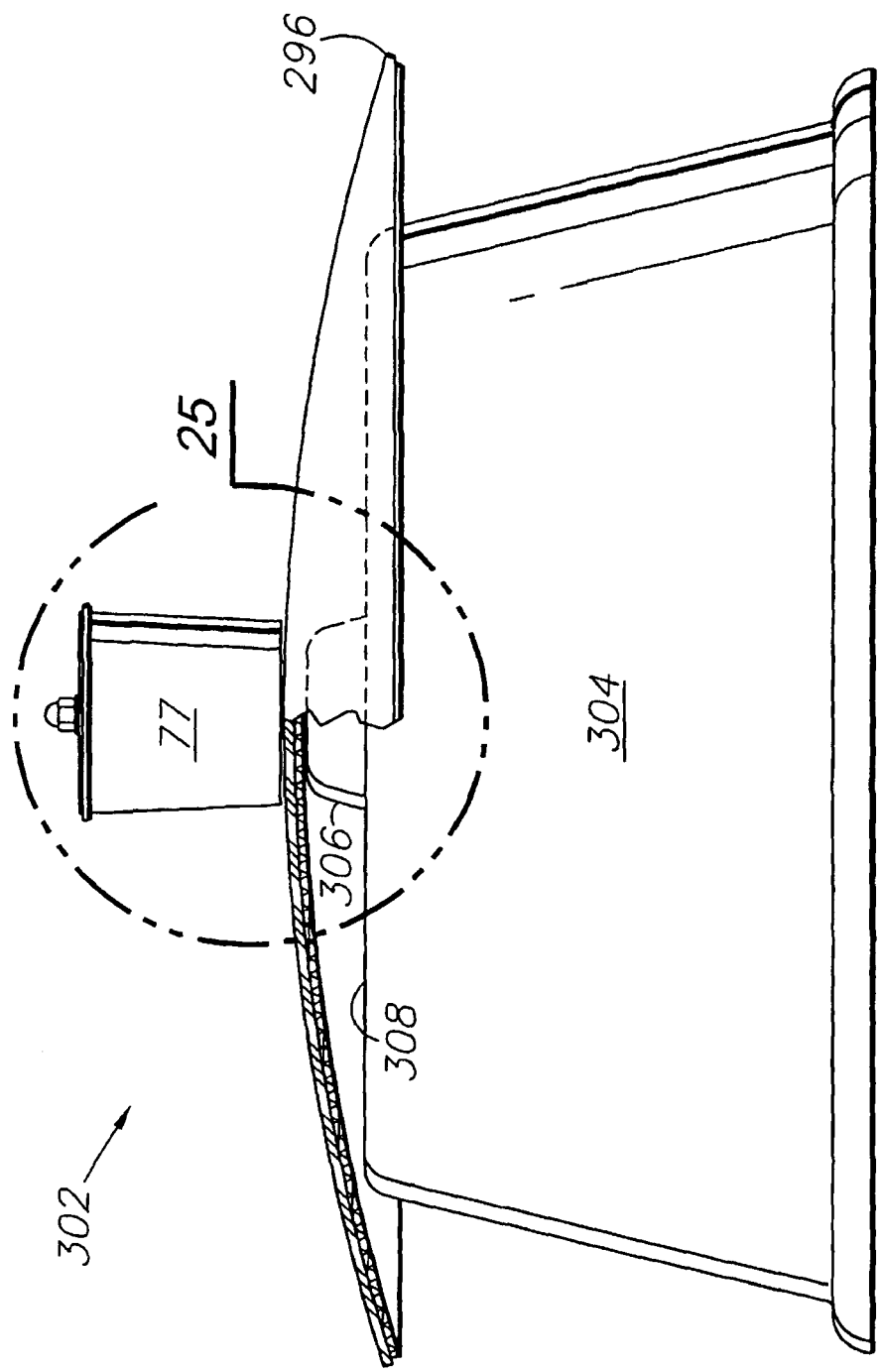
FIG. 24 is a side elevational view of a combination insecticide applicator and feeder for livestock, which comprises another modified aspect of the present invention.
Figure 25:
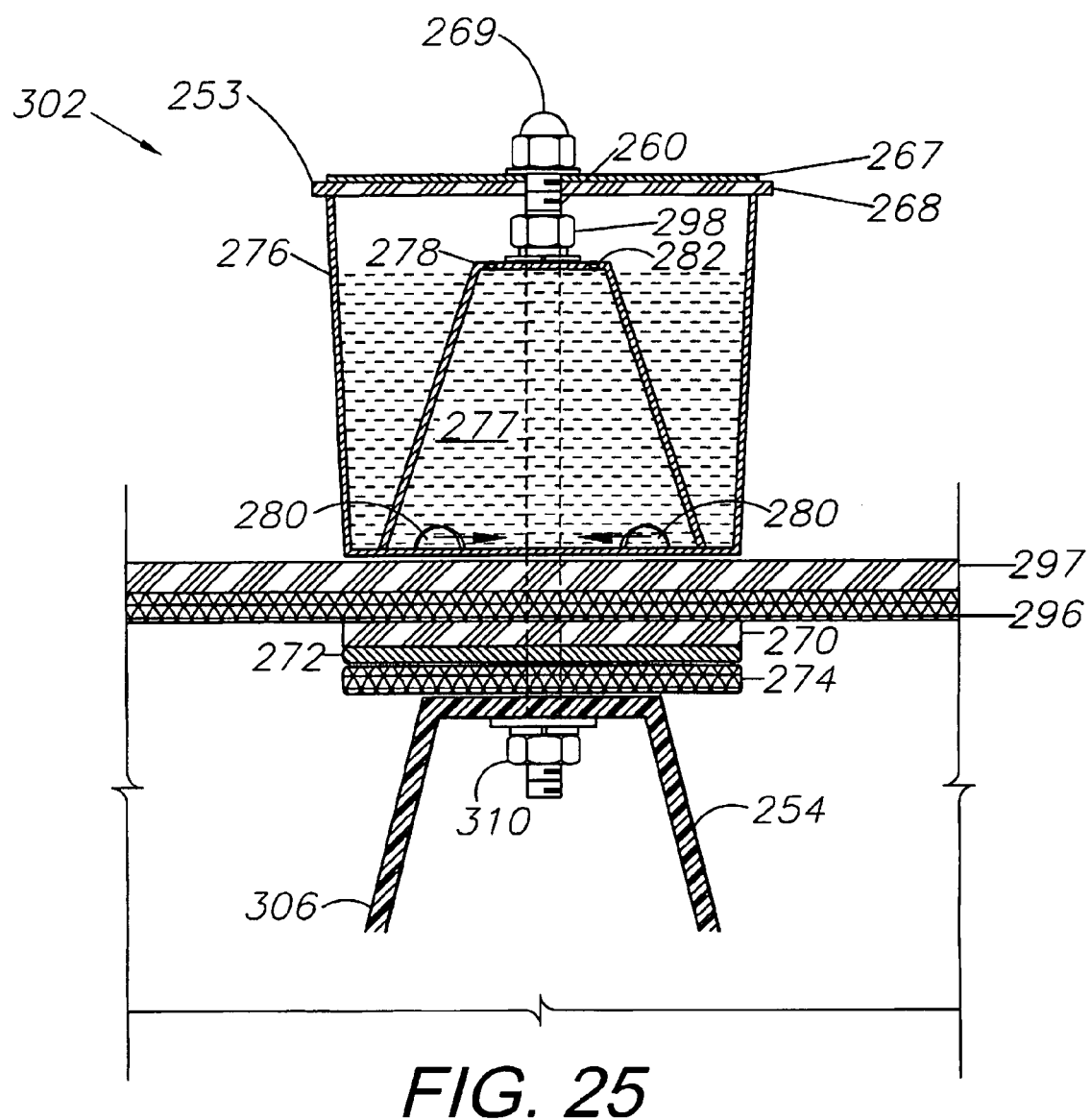
FIG. 25 is a fragmentary, cross-reference sectional view thereof, taken in generally within circle 25 in FIG. 24.
Figure 26:
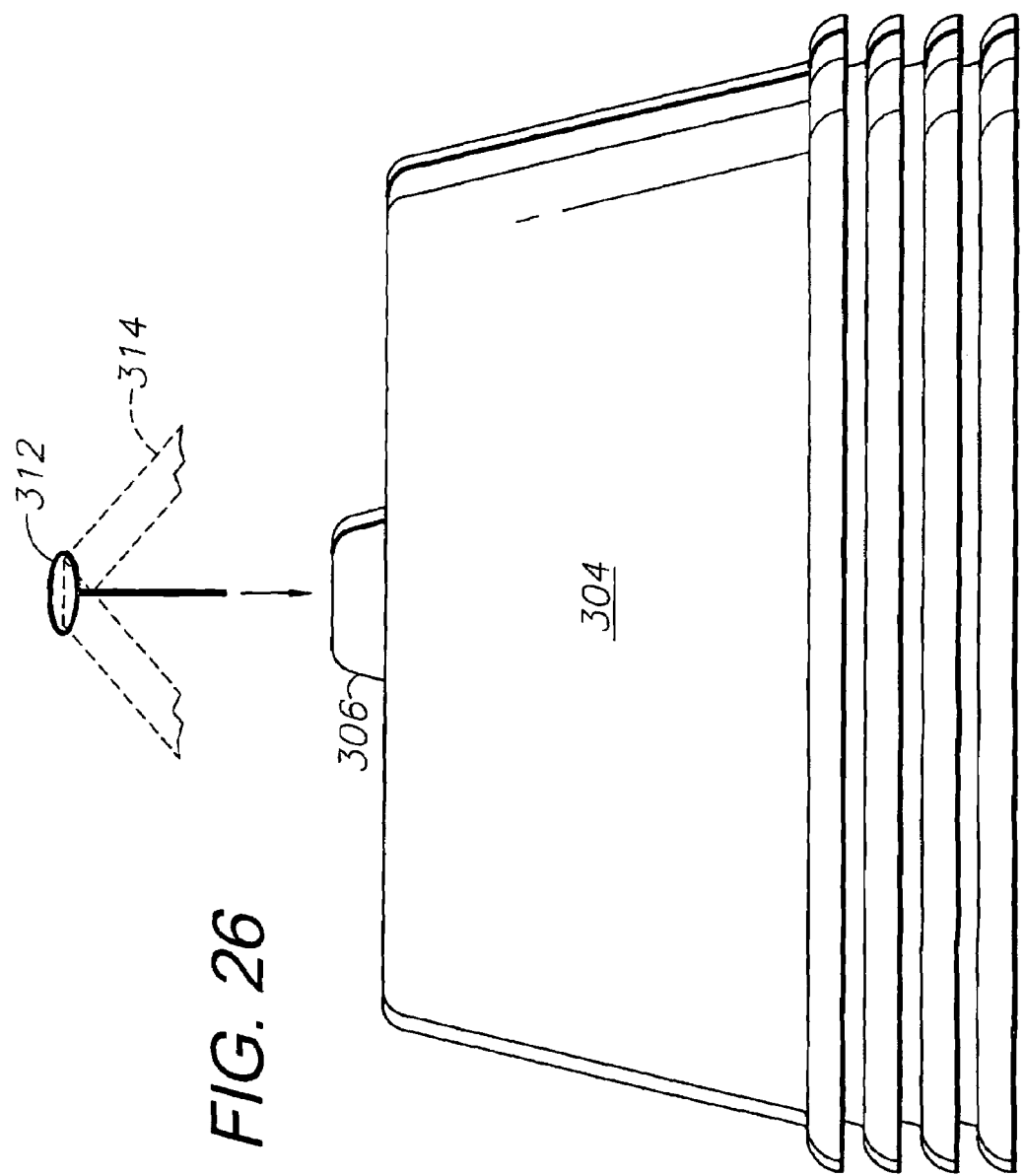
FIG. 26 is a side elevational view thereof, with multiple feeders stacked for securing in a nested configuration with an anchor ring receiving a tie-down strap.

FIGS. 24-26 show a modified liquid applicator and feeder combination 302 for livestock embodying another alternative aspect of the present invention. A modified feeder 304 includes an extended feeder cone 306, which protrudes above the level of an upper rim 308 of the feeder 304. The feeder cone 306 receives the threaded rod 260, which is threaded into the lock nut 292, which can comprise, for example, nylon or some other suitable thread-locking construction. The spacer assembly 264 described above can be eliminated by the extended feeder cone 306. The other components of the applicator and feeder combination 302 are generally similar to the applicator and feeder combination 252.

A transport configuration for multiple feeders 304 is shown in FIG. 26. The feeders 304 can be nested inverted, for example, on a palette. A retaining pin or eye-bolt 312 can be inserted through the feeder cone apertures, which are aligned in the nested configuration. A tiedown strip 314 is passed through the retaining pin or eye-bolt 312 and can be secured to a palette for retaining the feeders 304 thereon for shipping and storage.

It is to be understood that the invention can be embodied in various forms, and is not to be limited to the examples discussed above. Other components and configurations can be utilized in the practice of the present invention.

The invention claimed is:

1. A combination applicator and feeder for livestock, which comprises:
 a feeder including a feed receptacle and a cover support structure having a generally frusto-conical configuration, wherein said cover support structure being located in an interior portion of said feed receptacle;
 a reservoir connected to the cover support structure and adapted for receiving a quantity of liquid therein;
 a cover including a layer of wicking material;
 said cover being mounted on and supported by said support structure;
 said cover wicking material layer being in fluidic communication with said reservoir and a fastener assembly fastening said reservoir on said cover and said cover on said cover support structure, wherein said fastener assembly including a threaded rod extending through said reservoir and cover.

2. The applicator and feeder combination according to claim 1, which includes:
 said reservoir including a liquid-receiving chamber and a bottom positioned on top of said cover;
 said reservoir including a pressure cone located in said chamber;
 said pressure cone receiving said threaded rod;
 said pressure cone including a lower rim engaging said reservoir bottom;
 a compression nut threaded onto said threaded rod and engaging said pressure cone and adapted for compressing said pressure cone against said reservoir bottom and said reservoir bottom against said cover;
 said pressure cone including a top with a vent hole; and
 said pressure cone including a drain hole formed in said lower rim thereof and located adjacent to send reservoir bottom.

3. The applicator and feeder combination according to claim 2, which includes:
 said reservoir including a lid;
 said reservoir lid, reservoir bottom, cover and support structure including aligned apertures receiving said threaded rod; and
 said reservoir bottom and cover apertures providing a drain path for said liquid in said reservoir to said cover wicking material layer.

4. The applicator and feeder combination according to claim 1 wherein said fastener assembly includes:
 a washer located between said cover and said support structure; and
 said washer accommodating rotation of said receptacle and said cover on said feeder.

5. The applicator and feeder combination according to claim 4 wherein said fastener assembly includes:
 a rubber cushion mounted on said threaded rod between the underside of said cover and said washer; and
 a slip disk located between said washer and said support structure.

6. The applicator and feeder combination according to claim 1, which includes:
 a spacer assembly located between said cover and said support structure; and
 said threaded rod being connected to said spacer assembly.

7. The applicator and feeder combination according to claim 6, which includes:
 said spacer assembly including generally horizontal top and bottom plates;
 one of said plates including a pair of vertical panels extending to the other of said plates;
 an anchor bolt extending through said bottom plates and said support structure; and
 an anchor nut threaded on said anchor bolt in said support structure.

8. The applicator and feeder combination according to claim 7, which includes:
 each said panel including a tab; and
 the other of said plates including a pair of diametrically-opposed notches each receiving a respective panel tab.

9. The applicator and feeder combination according to claim 3, which includes:
 said feeder including an upper rim;
 said feeder cone extending above a level of said feeder upper rim;
 said feeder cone rotatably and centrally mounting said cover above the level of said upper rim.

10. The applicator and feeder combination according to claim 9, which includes:

said feeder being adapted for nesting with other said feeders with said feeder cone apertures aligned;
a retaining pin with a shaft and a ring mounted on an end of said shaft;
said retaining pin shaft being received in said aligned feeder cone receivers; and
a tiedown strap passing through said ring and adapted for attachment to an underlying structure.

11. A combination applicator and feeder for livestock, which comprises:
a feeder including a feed receptacle and a cover support structure extending above the level of said feed receptacle;
a cover adapted to receive a livestock treatment composition, wherein said cover includes an upper, impervious layer and a lower, permeable layer adapted to receive said livestock treatment composition;
said cover being mounted on and supported by said support structure in generally covering relation over said feed receptacle and adapted for being raised by livestock said cover lower layer comprising a wicking material; a liquid reservoir mounted on said support structure on top of said cover; said reservoir including a lid and a bottom; said reservoir lid, reservoir bottom, cover and support structure including aligned apertures receiving a threaded rod; and said reservoir bottom and cover apertures providing a drain path for liquid in said reservoir to said cover lower wicking material layer.

12. The applicator and feeder combination according to claim 11, which includes a powdered livestock treatment composition applied to said cover and adapted for application to livestock contacting said cover.

13. The applicator and feeder combination according to claim 12 wherein said cover comprises a 2-polymer urethane with said livestock treatment composition mixed therein.

14. A liquid applicator and feeder combination for livestock, which comprises:
a feeder including a feed receptacle and a cover support structure;
a reservoir connected to the cover support structure and adapted for receiving a quantity of liquid therein;
a cover including a layer of wicking material;
said cover being mounted on and supported by said cover support structure; and
said cover wicking material layer being in fluidic communication with said reservoir;
said cover support structure being located in an interior portion of said feed receptacle;
a fastener assembly fastening said reservoir on said cover and said cover on said cover support structure;
said cover support structure having a generally frusto-conical configuration;
said fastener assembly including a threaded rod extending through said reservoir and cover;
said reservoir including a liquid-receiving chamber and a bottom positioned on top of said cover;
said reservoir including a pressure cone located in said chamber;
said pressure cone receiving said threaded rod;
said pressure cone including a lower rim engaging said reservoir bottom;
a compression nut threaded onto said threaded rod and engaging said pressure cone and adapted for compressing said pressure cone against said reservoir bottom and said reservoir bottom against said cover;
said pressure cone including a top with a vent hole;
said pressure cone including a drain hole formed in said lower rim thereof and located adjacent to said reservoir bottom;
said reservoir including a lid;
said reservoir lid, reservoir bottom, cover and support structure including aligned apertures receiving said threaded rod;
said reservoir bottom and cover apertures providing a drain path for said liquid in said reservoir to said cover wicking material layer;
a washer located between said cover and said cover support structure;
said washer accommodating rotation of said receptacle and said cover on said feeder;
a rubber cushion mounted on said threaded rod between the underside of said cover and said washer; and
a slip disk located between said washer and said support structure.

15. The applicator and feeder combination according to claim 14, which includes:
a spacer assembly located between said cover and said support structure;
said threaded rod being connected to said spacer assembly;
said spacer assembly including generally horizontal top and bottom plates;
one of said plates including a pair of vertical panels extending to the other of said plates;
an anchor bolt extending through said bottom plates and said support structure; and
an anchor nut threaded on said anchor bolt in said support structure.

16. The applicator and feeder assembly according to claim 15, which includes:
each said panel including a tab; and
the other of said plates including a pair of diametrically-opposed notches each receiving a respective panel tab.

* * * * *